United States Patent [19]
Pedersen

[11] 4,373,957
[45] Feb. 15, 1983

[54] FIBRE-REINFORCED CEMENTITIOUS PRODUCT

[75] Inventor: Peder Pedersen, Hedehusene, Denmark

[73] Assignee: Rockwool International A/S, Hedehusene, Denmark

[21] Appl. No.: 288,120

[22] Filed: Jul. 29, 1981

Related U.S. Application Data

[63] Continuation of Ser. No. 121,154, Feb. 13, 1980, abandoned.

[30] Foreign Application Priority Data

Feb. 14, 1979 [DK] Denmark .............................. 631/79

[51] Int. Cl.³ .............................................. C04B 7/353
[52] U.S. Cl. .......................................... 106/93; 106/99
[58] Field of Search ..................................... 106/93, 99

[56] References Cited

U.S. PATENT DOCUMENTS 4,132,555  1/1979  Barrable ............................... 106/99

*Primary Examiner*—James Poer
*Attorney, Agent, or Firm*—Watson, Cole, Grindle & Watson

[57] ABSTRACT

A fibre-reinforced cementitious product comprising a cementitious matrix reinforced with a combination of hemp fibres and mineral fibres, the combination of fibres constituting from 3 to 13% by weight of the cementitious product.

7 Claims, No Drawings

FIBRE-REINFORCED CEMENTITIOUS PRODUCT

This application is a continuation application of application Ser. No. 121,154, filed Feb. 13, 1980, now abandoned.

BACKGROUND OF THE INVENTION

This invention relates to a fibre-reinforced cementitious product comprising a cementitious matrix having incorporated therein a combination of natural organic fibres and synthetic mineral fibres.

It is well known to use asbestos fibres for the reinforcement of cementitious products. Thus, asbestos fibres are widely used in the manufacture of roofing plates made from so-called asbestos cement. However, the use of asbestos fibere presents serious health problems because it has been found that such fibres may cause serious diseases in the respiratory system. As a result of these health problems, the use of asbestos fibres is prohibited in some countries.

It has been proposed to replace asbestos fibres as reinforcing fibres in cementitious products by other types of fibres including both natural organic fibres and synthetic mineral fibres.

In the copending application Ser. No. 82,547 filed on Oct. 9, 1979, now U.S. Pat. No. 4,263,049, there is described a fibre-reinforced cementitious product comprising a cementitious matrix having uniformly distributed therein a mixture of eucalyptus and synthetic mineral fibres.

While the properties of cementitious products reinforced by such a combination of fibres are generally satisfactory, there is a need for improving the toughness of fibre-reinforced products in order to reduce the risk of breakage during handling of the products.

Furthermore, it would be desirable to increase the green strength of the fibre-reinforced products in order to increase the production rate.

SUMMARY OF THE INVENTION

Surprisingly, it has been found that an improved toughness and an increased green strength can be obtained by substituting hemp fibres for eucalyptus fibres in the prior art fibre-reinforced products. Thus, the fibre-reinforced cementitious product of the invention comprises from 3 to 13% by weight of a combination of hemp fibres and synthetic mineral fibres.

The weight ratio of hemp fibres to mineral fibres is preferably about 1:1 and the total amount of fibres about 10% of the total weight of the fibre-reinforced product.

The mineral fibres should preferably constitute at least 5% of the total weight of the fibre-reinforced product.

The amount of hemp fibres preferably falls within the range of 3–7% by weight and in case the amount of hemp fibres is about 3%, the amount of mineral fibres should preferably be at least 7% by weight.

The hemp and mineral fibres may also be used in combination with other types of natural organic fibres, e.g. eucalyptus fibres.

A preferred combination of such fibres is 2.5% hemp fibres, 2.5% eucalyptus fibres and 5% mineral fibres. A cementitious product reinforced with such a combination of hemp fibres, eucalyptus fibres and mineral fibres has excellent strength properties, viz. a bending strength of about 255 kg/cm$^2$ in the machine direction and about 166 kg/cm$^2$ in the cross machine direction.

Thus, the strength is of the same order as that of cementitious products reinforced with asbestos fibres.

However, the density of such a fibre-reinforced product is much lower, viz. about 1.33 g/cm$^3$, than that of asbestos products, viz. about 1.6 g/cm$^3$.

It is assumed that the improved strength obtained by using hemp fibres instead of eucalyptus fibres is due to the fact that hemp fibres ordinarily are relatively long. Thus, hemp fibres normally have a length of from 5 to 55 mm.

The reinforcing effect of combinations of hemp fibres and mineral fibres have been compared by that of combinations of eucalyptus fibres and mineral fibres by a series of tests.

The tests were carried out in the following manner:

Cellulosic fibres were dispersed in 1 liter water and 5 liters additional water and rock wool fibres were added. Subsequently, the mixture thus obtained was stirred for 5 minutes before Portland cement was added.

After stirring for 5 minutes, a polyelectrolyte ("Reten 123 x") was added in an amount of 4.2 ppm. Stirring was continued for one additional minute and the mixture was then transferred to a sheet mould comprising a net covered by a sheet of filter paper. The mixture was then dewatered by suction and the layer thus formed on the sheet of filter paper was compressed at increasing pressures (1 minute at 5 kp/cm$^2$, 1 minute at 10 kp/cm$^2$ and 1 minute at 15 kp/cm$^2$).

Subsequently, 5 layers of filter paper were placed on each side of the fibre cement plate formed and the plate was compressed for 2 minutes at a pressure of 60 kp/cm$^2$.

The plates thus prepared were stored at room temperature and a relative humidity of 100% and the bending strength and density were measured.

The composition of the tested samples comprising a combination of mineral fibres and hemp fibres and their properties are reported in Table I.

A similar series of tests in which the hemp fibres were replaced by eucalyptus fibres gave the data set forth in Table II.

TABLE I

| Reinforcing fibres | | Measured bending strength after storage for 28 days, kg/cm$^2$ | Density, g/cm$^3$ | Corrected bending strength, based on a density of 1.7 g/cm$^3$, kg/cm$^2$ |
|---|---|---|---|---|
| Rock wool fibres, % | Hemp fibres, % | | | |
| 1 | 2 | 146 ± 11 | 1.55 ± 0.03 | 176 ± 17 |
| 5 | 3 | 167 ± 11 | 1.53 ± 0.03 | 205 ± 17 |
| 5 | 5 | 209 ± 11 | 1.52 ± 0.03 | 262 ± 17 |
| 5 | 7 | 228 ± 11 | 1.49 ± 0.03 | 296 ± 17 |
| 7 | 3 | 206 ± 34 | 1.48 ± 0.08 | 267 ± 20 |
| 7 | 5 | 221 ± 15 | 1.54 ± 0.04 | 273 ± 29 |
| 7 | 6 | 220 ± 11 | 1.49 ± 0.03 | 285 ± 17 |

TABLE II

| Reinforced fibres | | Measured bending strength after storage for 28 days, kg/cm$^2$ | Density, g/cm$^3$ | Corrected bending strength, based on a density of 1.7 g/cm$^3$, kg/cm$^2$ |
|---|---|---|---|---|
| Rock wool fibres, % | Eucalyptus fibres, % | | | |
| 5 | 2 | 110 ± 11 | 1.61 ± 0.03 | 123 ± 17 |
| 5 | 3 | 145 ± 11 | 1.58 ± 0.03 | 167 ± 17 |
| 5 | 5 | 187 ± 11 | 1.55 ± 0.03 | 224 ± 17 |
| 5 | 7 | 206 ± 11 | 1.50 ± 0.03 | 265 ± 17 |

TABLE II-continued

| Reinforced fibres | | Measured bending strength after storage for 28 days, kg/cm² | Density, g/cm³ | Corrected bending strength, based on a density of 1.7 g/cm³, kg/cm² |
|---|---|---|---|---|
| Rock wool fibres, % | Eucalyptus fibres, % | | | |
| 7 | 3 | 140 ± 14 | 1.55 ± 0.03 | 169 ± 20 |
| 7 | 5 | 160 ± 16 | 1.52 ± 0.03 | 200 ± 20 |
| 7 | 6 | 195 ± 11 | 1.52 ± 0.03 | 245 ± 17 |

As will appear from Tables I and II, cementitious products reinforced with a combination of mineral fibres and hemp fibres have a bending strength which is far superior to that of products reinforced with a combination of mineral fibres and eucalyptus fibres.

The fibre-reinforced products of the invention exhibit an excellent toughness which minimizes the risk of breakage during handling and use. Therefore, such products are particularly suitable for use as roofing plates which should be capable of withstanding blows and impacts without breakage.

The toughness of the products of the invention has been compared to that of products reinforced by a combination of mineral fibres and eucalyptus fibres by integrating the area below the deflection curves obtained by measuring the deflection of specimens supported at their ends and subjected to increasing loads up to the load causing breakage.

The toughness thus determined corresponds to the work required to cause breakage.

By testing different products it has been found that the work required to cause breakage of a reinforced product containing 3% hemp fibres and 5% mineral fibres is 13.3 higher than that required to cause breakage of a non-reinforced cementitious product. The corresponding factor for a product containing 5% hemp fibres and 5% mineral fibres is 15.5. The factor obtained when testing a product containing 5% eucalyptus fibres and 5% mineral fibres is 7.7. Thus, it is manifest that also the toughness of products of the invention is superior to that of cementitious products ocntaining a combination of eucalyptus fibres and mineral fibres.

The green strength of the products of the invention has been tested by subjecting moulded specimens of a length of 18 cm and supported at their ends to a given load shortly after their removal from the mould and by measuring their deflection.

The data obtained will appear from Table III.

TABLE III

| Deflection tests. | |
|---|---|
| Fibre reinforcement | Deflection, cm |
| 5% mineral fibres + 5% eucalyptus fibres | 2.55 |
| 5% mineral fibres + 4.5% eucalyptus fibres + 0.5 hemp fibres | 2.25 |
| 5% mineral fibres + 4% eucalyptus fibres + 1% hemp fibres | 1.75 |
| 10% asbestos fibres | 1.75 |

As will appear from Table III the green strength increases when the eucalyptus fibres are replaced by hemp fibres and when only 1% of hemp fibres are used instead of eucalyptus fibres, the green strength is of the same order as that of an asbestos-reinforced product.

The synthetic mineral fibres used in the product of the invention are preferably rock wool fibres or slag wool fibres.

I claim:

1. A fibre-reinforced cementitious product comprising a matrix of cementitious material and 3 to 13% by weight, based on the total weight of the cementitious product, of a fibrous material comprising a mixture of rock wool fibers and a sufficient amount of hemp fibers to provide a final product having an average minimum bending strength of 176±17 kg/cm² at 1.7 g/cm³.

2. A cementitious product as set forth in claim 1 wherein the weight ratio of hemp fibers to rock wool fibers in said fibrous material is about 1:1.

3. A cementitious product as set forth in claim 1 wherein the amount of said fibrous material is about 10% by weight.

4. A cementitious product as set forth in claim 1 wherein said rock wool fibers are present in an amount of at least 5% by weight based on the total weight of the product.

5. A cementitious product as set forth in claim 1 wherein said hemp fibers are present in an amount of from 1% to 7% by weight based on the total weight of the product.

6. A cementitious product as set forth in claim 1 wherein said fibrous material also includes a second type of natural organic fiber.

7. A cementitious product as set forth in claim 1 wherein said fibrous material also includes eucalyptus fibers.

* * * * *